(12) United States Patent
Terradellas Callau et al.

(10) Patent No.: US 11,352,213 B2
(45) Date of Patent: Jun. 7, 2022

(54) PRINTING SYSTEM

(71) Applicant: HEWLETT-PACKARD DEVELOPMENT COMPANY, L.P., Spring, TX (US)

(72) Inventors: Roger Terradellas Callau, Sant Cugat del Valles (ES); Brian Carvajal, Sant Cugat del Valles (ES); Inaki Zudaire Rovira, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 67 days.

(21) Appl. No.: 16/605,612

(22) PCT Filed: Mar. 27, 2018

(86) PCT No.: PCT/US2018/024471
§ 371 (c)(1),
(2) Date: Oct. 16, 2019

(87) PCT Pub. No.: WO2019/190472
PCT Pub. Date: Oct. 3, 2019

(65) Prior Publication Data
US 2021/0276813 A1  Sep. 9, 2021

(51) Int. Cl.
*B65G 45/10* (2006.01)
*B41J 29/17* (2006.01)

(52) U.S. Cl.
CPC .............. *B65G 45/10* (2013.01); *B41J 29/17* (2013.01)

(58) Field of Classification Search
CPC ................................. B65G 45/10; B41J 29/17

USPC .......................................................... 198/494
See application file for complete search history.

(56) References Cited

U.S. PATENT DOCUMENTS

| 5,526,028 | A | 6/1996 | Rottman |
| 6,679,601 | B1 | 1/2004 | Pham et al. |
| 6,698,878 | B1 * | 3/2004 | Roche .................... B41J 11/007 134/9 |
| 6,945,383 | B2 | 9/2005 | Pham |
| 7,101,033 | B2 | 9/2006 | Roche et al. |
| 7,471,914 | B2 | 12/2008 | Jenak et al. |
| 8,523,317 | B2 | 9/2013 | Bober |

(Continued)

FOREIGN PATENT DOCUMENTS

| CN | 202414712 U | 9/2012 |
| CN | 205768031 U | 12/2016 |

(Continued)

*Primary Examiner* — Gene O Crawford
*Assistant Examiner* — Lester Rushin, III
(74) *Attorney, Agent, or Firm* — HP Inc. Patent Department (57) ABSTRACT

A printing system is described, which comprises: a conveyor belt; a first substrate supply mechanism to supply a cleaning substrate to said conveyor belt; wherein said conveyor belt is to advance a supplied cleaning substrate, and said first substrate supply mechanism is controllable to adjust motion of said substrate relative to said conveyor belt such that when said conveyor belt is activated said supplied cleaning substrate slides relative to the conveyor belt; and said printing system further comprising a friction adjustment mechanism to adjust an amount of friction between said conveyor belt and said supplied substrate.

13 Claims, 4 Drawing Sheets

(56) References Cited

U.S. PATENT DOCUMENTS

| | | | |
|---|---|---|---|
| 8,827,410 B2* | 9/2014 | Sheflin | B41J 29/17 347/17 |
| 10,274,873 B2* | 4/2019 | Shigihara | G03G 15/1615 |
| 2003/0209158 A1 | 11/2003 | Porat | |
| 2013/0276654 A1 | 10/2013 | Belbeck | |
| 2014/0083459 A1* | 3/2014 | Read | B24C 3/083 134/15 |
| 2016/0257141 A1* | 9/2016 | De Roeck | B41J 11/0085 |

FOREIGN PATENT DOCUMENTS

| | | |
|---|---|---|
| DE | 10126374 A1 | 12/2001 |
| WO | WO1993014934 A1 | 8/1993 |

\* cited by examiner

Fig. 4

PRINTING SYSTEM

BACKGROUND

Some printing systems include a conveyor belt to support and move a printing substrate in coordination with printing components to produce a printed product. The printing substrate is supplied to the conveyor belt from a print substrate supply mechanism. In such printing systems, a printing substrate may become skewed during a printing operation and, consequently, a print agent may be deposited on the conveyor belt instead of the printing substrate. Also leakage of a print agent onto the conveyor belt may occur. Accumulation of print agent on the conveyor belt is removed during a maintenance and/or cleaning operation. A conveyor belt maintenance and/or cleaning operation may be carried out by a service technician with a cleaning implement, e.g. a brush. However, cleaning in this manner could potentially damage the conveyor belt, for example if the service technician uses excessive force when applying the cleaning implement.

Such printing systems may also be maintained and/or cleaned to remove print agent deposits from the conveyor belt by passing a cleaning substrate across the conveyor belt. This is achieved by loading the cleaning substrate in the print substrate supply mechanism and conducting a cleaning operation by moving the cleaning substrate relative to the conveyor belt.

DETAILED DESCRIPTION

Certain examples described herein relate to printing systems with a conveyor belt to advance rigid or flexible print substrate, onto which an image is printed. In some examples, the printing system is a two-dimensional (2D) printing system such as an inkjet or digital offset printer. In these examples, the print substrate may comprise paper, cardstock, boards, metal sheet, plastic sheet, and the like. The printing system may be a large format printer for printing signs, billboards and/or other displays in latex-based inks. .A sheet of print substrate rests on top of the conveyor belt and is driven through a print zone. In the print zone, an image is printed onto the substrate, for example by applying printing fluid using inkjet print heads mounted above the conveyor belt. In other examples, the printing system is a three-dimensional (3D) printing system, otherwise known as an additive manufacturing system. In these examples, the print substrate may comprise a build material. For example, the build material may be deposited on top of the conveyor belt and be driven through the additive manufacturing system. Some additive manufacturing systems use a "layer-by-layer" approach, where a solidification process is applied to each layer of deposited build material before the next layer of build material is applied. Various methods can be used to secure the print substrate to the conveyor belt. For example, a vacuum mechanism may be used to secure the print substrate to the conveyor belt via suction.

In such printing systems, a cleaning substrate can be loaded in the printing system, advanced over the conveyor belt and then held relative to the conveyor belt while the conveyor belt moves, or moved relative to the conveyor belt. A cleaning operation can be implemented by causing relative movement between the cleaning substrate and the conveyor belt to allow deposits to be cleaned, or scrubbed, therefrom.

Figure 1:
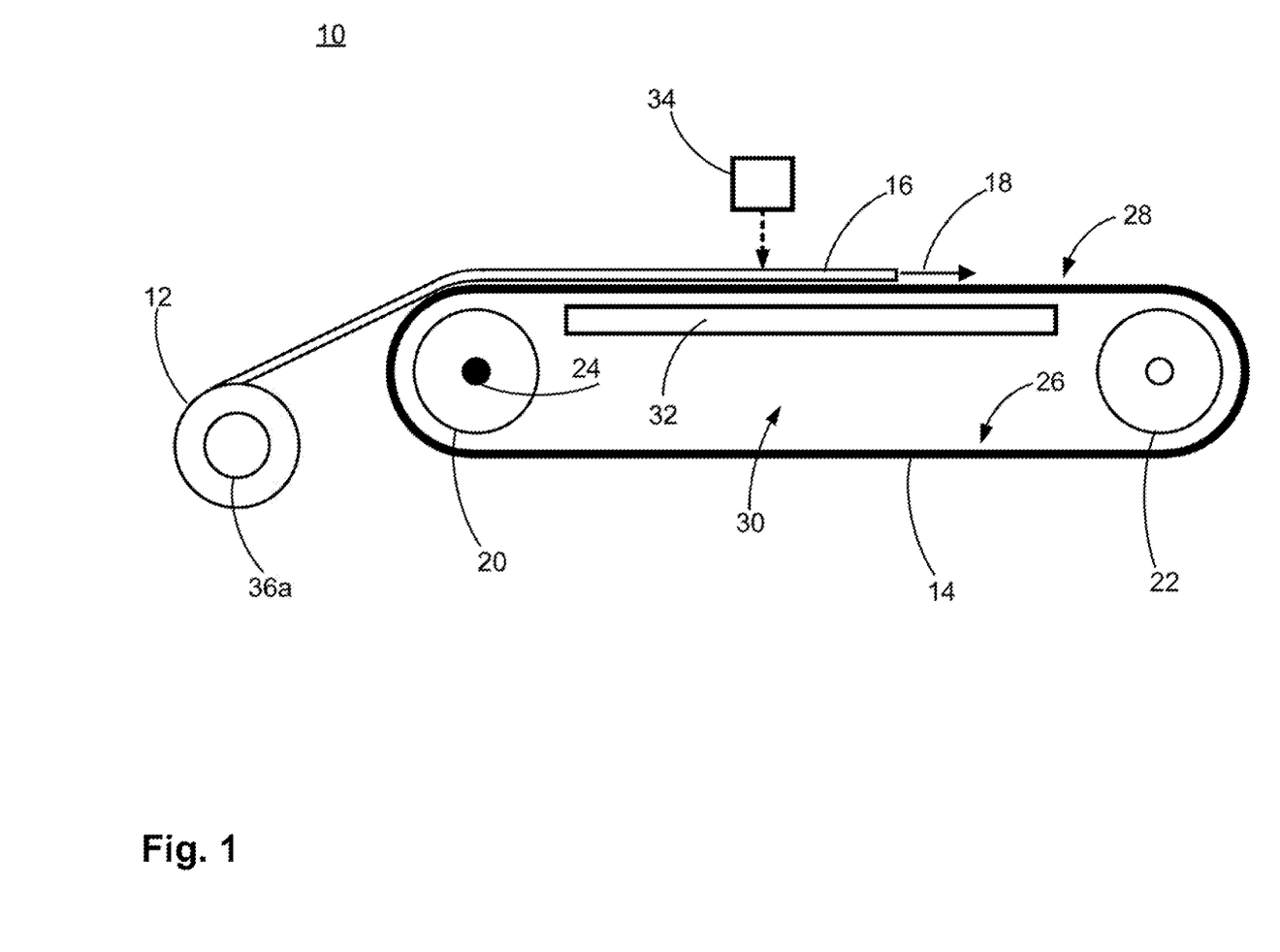
FIG. 1 illustrates a schematic representation of a printing system according to an example.
Figure 2:
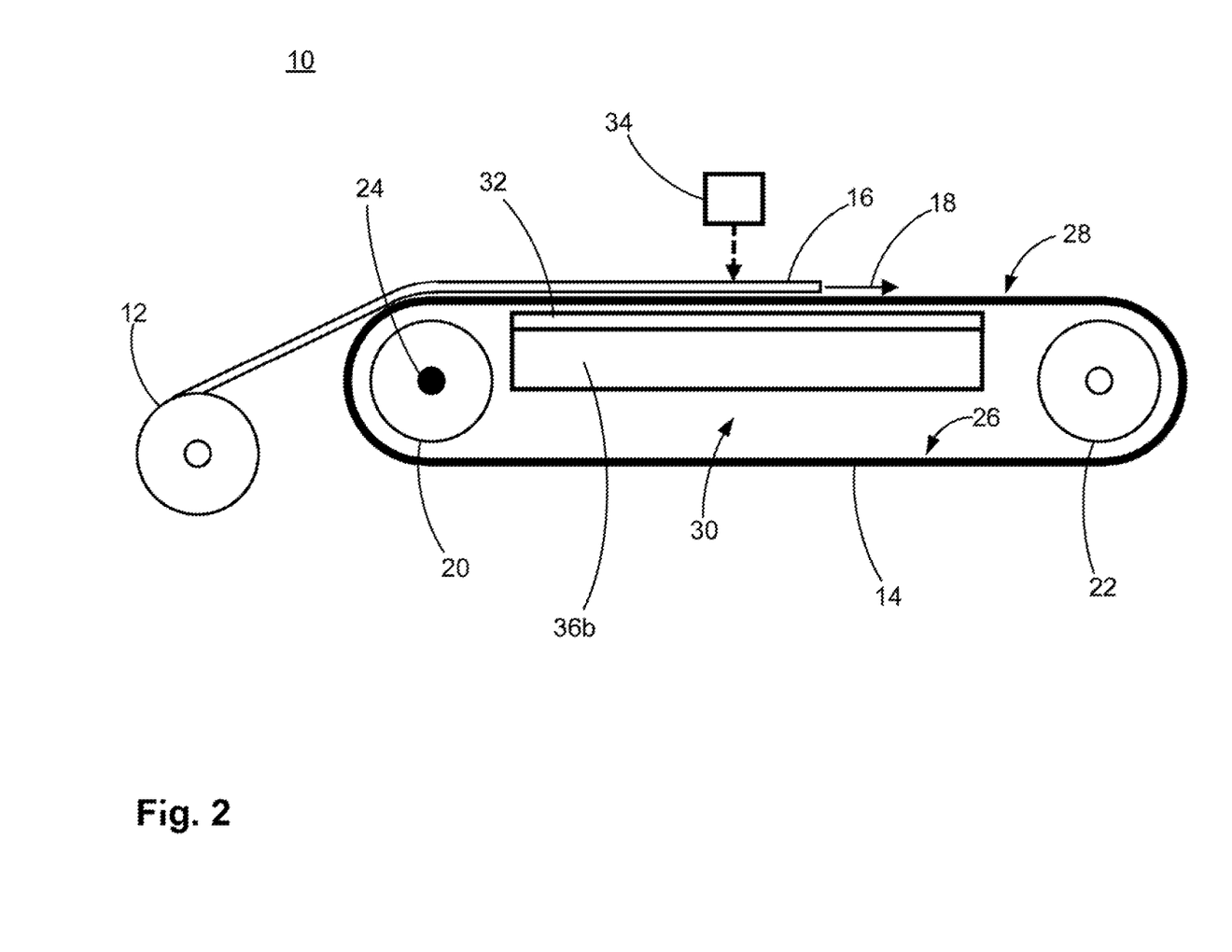
FIG. 2 illustrates a schematic representation of a printing system according to another example.

FIGS. 1 and 2 show schematic representations of printing system 10 according to examples.

Referring to FIG. 1, the printing system 10 comprises a first substrate supply mechanism 12 to provide a cleaning substrate and/or a print substrate to a conveyor belt 14 of the printing system 10. In some examples, first substrate supply mechanism is to provide a cleaning substrate to the conveyor belt 14 (and a second substrate supply mechanism (not shown) is to provide a print substrate to the conveyor belt 14). In other examples, the first substrate supply mechanism 12 can provide a cleaning substrate or a print substrate, with the cleaning substrate and print substrate interchangeable in the first substrate supply mechanism 12 dependent upon an operation to be performed (i.e. a cleaning operation or a printing operation). In some examples, the first substrate supply mechanism 12 comprises a roll for supplying flexible cleaning substrate. Examples of cleaning substrate include a substrate comprising a cleaning surface comprising at least one of a textured surface; a rough surface; an uneven surface; a solvent; and a first portion including a solvent and a second portion excluding a solvent. The cleaning substrate may comprise paper (e.g. a paper with a rough surface such as wallpaper) and/or flexible plastic. Such a roll may comprise flexible substrate wound around a core, to enable compact storage.

As indicated above, the printing system 10 further comprises conveyor belt 14. The first substrate supply mechanism 12 can supply cleaning substrate 16 to the conveyor belt 14. The conveyor belt 14 is to advance the supplied cleaning substrate in a conveyance direction 18 until the cleaning substrate is located in a cleaning position. The conveyor belt 14 can include a loop or band of material with sufficient flexibility to bend or deform around rollers for moving the conveyor belt 14. In some examples, the conveyor belt 14 can include segmented rigid or semi-rigid sections coupled to one another by hinged connectors.

In some examples, the conveyor belt 14 is disposed around a drive roller 20 and an idle roller 22. The drive roller 20 can comprise a drive mechanism 24, for example a motor or a motorized shaft, for turning the drive roller 20. In turn, the drive roller 20 can apply a force to the conveyor belt 14 that causes it to move about the rollers 20, 22. As such, rotational movement of the drive roller 20 can be translated into corresponding linear motion of the conveyor belt 14. The linear motion of the conveyor belt 14 can then be used to move material disposed thereon.

In examples, the conveyor belt 14 is elongate with a length in the conveyance direction 18 that the conveyor belt 14 moves in, and a lateral dimension or width in a direction perpendicular to the conveyance direction 18. The length may be larger than the width.

The conveyor belt 14 has an interior surface 26 and an exterior surface 28. The exterior surface 28 is a surface on which cleaning substrate 16 is carried and/or supported (during a cleaning operation, and on which a print substrate would be carried during a print operation). In examples, the cleaning substrate 16 is held to the exterior surface 28 by gravity, friction, clamps, and/or vacuum (see FIG. 2). The interior surface 26 may be considered the surface of the conveyor belt 14 in contact with or disposed in proximity to the rollers 20, 22 on which the conveyor belt 14 moves. As such, the conveyor belt 14 can define an interior and exterior relative to the conveyor belt 14. For example, the region within the confines of the loop of the conveyor belt 14 and proximate to the interior surface 26 of the conveyor belt 14 can be referred to herein as the conveyor belt interior 30.

In some examples, in which the first substrate supply mechanism 12 comprises a roll of substrate, the roll is received by a rotatable shaft of the substrate supply mechanism 12. During a cleaning operation (and also a printing operation), the rotatable shaft unwinds the roll at the speed of the conveyor belt 14, for example by way of a servo controlling the rotation or by way of the substrate being pulled by the conveyor belt 14.

The cleaning operation differs from the printing operation in that when the cleaning substrate reaches the cleaning position, unwinding of the roll of cleaning substrate is stopped, but the motion of the conveyor belt 14 continues so that the unwound portion of cleaning substrate rubs, passes, or brushes over the exterior surface 28 of conveyor belt 14. In some examples, the cleaning substrate 12 may be wound back onto the roll so that a leading edge of the cleaning substrate 12 moves in a direction opposite to a conveyance direction 18 of the conveyor belt 14. During a printing operation, a printing substrate would continue to be unwound from the roll until a print operation is complete. In other words, the first substrate supply mechanism 12 is controllable to adjust motion of the cleaning substrate 16 relative to the conveyor belt 14 such that when the conveyor belt 14 is activated the supplied cleaning substrate 16 slides relative to the conveyor belt 14.

In some examples, the printing system 10 comprises a substrate position indicator to indicate a loading position for the cleaning substrate 16. In one such example, a user loads a roll of substrate onto the aforementioned rotatable shaft and inflates pneumatic lugs to lock the roll onto the shaft. The user then partially unrolls the substrate 16 onto the conveyor belt 14. The substrate position indicator, for example an alignment bar or reference mark, serves to indicate an approximate suitable position for the leading edge of the substrate 16

The printing system 10 also comprises a platen 32 within the conveyor belt interior 30 and proximate to the interior surface 26 of the conveyor belt 14. The platen 32 provides a flat surface to support the cleaning substrate 16 during a cleaning operation (and can also support a print substrate during a printing operation).

The printing system 10 also comprises printing elements 34, for example including a print head or print heads for applying printing material or printing fluid, such as ink, to a print substrate during a printing operation. In some examples, the printing elements 34 can move laterally during printing as the conveyor belt 14 moves intermittently in the conveyance direction 18. In other examples, the printing elements 34 are static and extend over the width of a print substrate on which printing is performed.

In the printing system 10, the first substrate supply mechanism 12 is controllable by a control mechanism (not shown) to adjust motion of the substrate 16, i.e. the first substrate supply mechanism 12 can be switched between a state in which supply of the cleaning substrate 16 is allowed, and a state in which supply of substrate 16 is prevented. For example, where the first substrate supply mechanism 12 comprises a roll of flexible substrate, a locking mechanism may be provided to adjust motion of the substrate 16 supplied by the first substrate supply mechanism 12. This can be achieved by the locking mechanism acting upon the first substrate supply mechanism 12 as a brake to prevent rotation of the roll. In other examples, the locking mechanism can act directly on the cleaning substrate 16, for example by clamping the cleaning substrate 16 to prevent motion. Alternatively or additionally, as noted above, in some examples where the first substrate supply mechanism 12 comprises a shaft for receiving a roll of substrate, the shaft is rotatable by a servo. Motion of the cleaning substrate 16 can be adjusted by the controlling the servo prevent such motion.

The printing system 10 also comprises a friction adjustment mechanism to adjust an amount of friction between the conveyor belt 14 and a supplied cleaning substrate 16. In some examples (FIG. 1) the friction adjustment mechanism 36a can control the first substrate supply mechanism 12 so that motion of the cleaning substrate 16 relative to the conveyor belt 14 can be adjusted. In such examples, the friction adjustment mechanism 36a comprises a separate, additional feature to the control mechanism, and acts on the first substrate supply mechanism 16 to apply a tensioning force to the supplied substrate to set tension of the substrate to a tension suitable for the cleaning operation. In one such example, following a loading operation of the cleaning substrate 16 into the first substrate supply mechanism 12, motion of the substrate 16 is allowed and the friction adjustment mechanism 36a acts on the first substrate supply mechanism 12 to apply a force to the substrate 16 in a direction opposite to the conveyance direction 18. For example, where the first substrate supply mechanism 12 comprises a roll of substrate, the friction adjustment mechanism 36a can act upon the roll to rotate the roll away from the conveyor belt 14, i.e. in a "rewinding" direction, to provide the tension. This "tensioning" also adjusts an amount of friction between cleaning substrate 16 and conveyor belt 14. The friction adjustment mechanism 36a can also act upon the roll to prevent movement of the roll (i.e. prevent further unwinding of the roll) so that a leading edge of the roll remains in a same position while the conveyor belt 14 can be free to move thereunder. The friction adjustment mechanism 36a can also act upon the roll to slow movement of the roll compared with a speed at which the conveyor belt 14 advances in the conveyance direction. In other words, the roll can be unwound, but at a rate that is slower than that of the conveyor belt so that a point on the cleaning substrate 16 will not advance in the conveyance direction as quickly as a point on the conveyor belt 14. In all these examples, adjusting the movement of the cleaning substrate 16 relative to the conveyor belt 14 adjusts an amount of friction between the conveyor belt 14 and cleaning substrate 16.

In a further example, the friction adjustment mechanism 36a can operate to unwind a roll of cleaning substrate during some parts of a cleaning cycle and rewind the roll during other parts of the cleaning cycle. Such unwinding and rewinding may occur alternately on a periodic basis. Periods of unwinding and rewinding may be of equal lengths of time, or may be different, or may be random.

In the above-described examples, the friction adjustment mechanism 36a comprises the control mechanism and acts on the substrate supply mechanism 12 to prevent motion of the substrate 16 by engaging, or partially engaging, a locking element. For example, where the substrate supply mechanism comprises a roll of flexible substrate, the locking mechanism may comprise a brake preventing, or reducing, rotation of the roll. In other examples, the locking mechanism can act directly on the substrate 16, for example by clamping the substrate 16 to prevent, or reduce, motion. In further examples where the first substrate supply mechanism 12 comprises a shaft for receiving a roll of substrate, the shaft is rotatable by a servo. Motion of the substrate 16 can be adjusted by the friction adjustment mechanism 36a controlling the servo to prevent such motion. In further examples, the friction adjustment mechanism 36a can comprise the servo.

In some examples, the friction adjustment mechanism 36a can act as the control mechanism.

In further examples of a friction adjustment mechanism (see FIG. 2), a friction adjustment mechanism 36b comprises a pressure application mechanism to adjust an amount of friction between the supplied substrate 16 and the conveyor belt 14. Increasing pressure applied by the pressure application mechanism to the cleaning substrate 16 forces the cleaning substrate 16 into the exterior surface 28 of the conveyor belt 14 with greater force and reducing the pressure reduces the force that the cleaning substrate 16 exerts on the exterior surface of the conveyor belt 14, i.e. am amount of friction between the cleaning substrate 16 and the conveyor belt 14 is dependent upon the force applied by the pressure application mechanism.

In some examples, the pressure application mechanism of the friction adjustment mechanism 36b comprises a vacuum pump, positioned in the interior 32 of the conveyor belt 14 (i.e. as shown in FIG. 2), to exert vacuum pressure on the substrate 16 to reduce or increase the force at which the cleaning substrate 16 is held against the conveyor belt 14. In such examples, the conveyor belt 14 can include openings, channels, or holes through which the vacuum pump can apply the vacuum to the cleaning substrate 16. In other examples, the pressure application mechanism of the friction adjustment mechanism 36b can comprise another type of pressure source, such as a pump or other element to press the cleaning substrate 16 onto the conveyor belt 14 from above. The pressure application mechanism of the friction adjustment mechanism 36b can thus provide a force that adjusts the friction between the cleaning substrate 16 and the exterior surface 28 of the conveyor belt 14.

Although a printing system 10 is illustrated with one type of friction adjustment mechanism in the figures (i.e. friction adjustment mechanism 36a in FIG. 1 and friction adjustment mechanism 36b in FIG. 2), in other examples, the printing system 10 may comprise both types of friction adjustment mechanism, i.e. 36a and 36b. Further, both types of friction adjustment mechanism may be employed together, or separately, in a printing system 10 with the control mechanism.

The following description applies to the printing system 10 of FIG. 1. The printing system 10 performs a substrate loading operation, in which cleaning substrate 16 is loaded for a cleaning operation. During such a substrate loading operation of the printing system 10, the first substrate supply mechanism 12 is allowed to release the cleaning substrate 16 so that it can pass onto the conveyor belt 14. When the conveyor belt 14 is activated, the supplied substrate 16 moves with the conveyor belt 14 and the leading edge advances in the conveyance direction 18. Upon reaching the cleaning position, motion of the cleaning substrate 16 is inhibited by controlling the first substrate supply mechanism 12 to adjust motion of the substrate relative to the conveyor belt to prevent further advancement of the substrate 16. This can be done by the control mechanism, or by the friction adjustment mechanism 36a (if the friction adjustment mechanism 36a is the control mechanism), or by a combination of both mechanisms (if both are present).

As such, during the substrate loading operation, motion of the cleaning substrate 16 is allowed and the conveyor belt 14 is activated to rotate in the conveyance direction 18 to advance the cleaning substrate 16 toward the cleaning position. When the cleaning substrate 16 is in the cleaning position, advancement of the cleaning substrate 16 is inhibited by the control mechanism (e.g. locking element and/or servo) and/or the friction adjustment mechanism 36a. Therefore, in an example, the first substrate supply mechanism 12 allows motion of the cleaning substrate 16 during a loading operation of the printing system 10 until the cleaning position is reached. For example, motion of the cleaning substrate 16 during the loading operation is allowed by disengaging a locking element from the first substrate supply mechanism 12, and/or controlling a servo to allow motion, and/or by controlling the friction adjustment mechanism 36a to allow motion. Motion of the cleaning substrate during a cleaning operation is inhibited or prevented, or can be allowed periodically in the conveyance direction and in a direction opposite to the conveyance direction, by engaging the locking element with the first substrate supply mechanism, and/or by controlling the servo to adjust motion of the cleaning substrate, and/or by controlling the friction adjustment mechanism 36a to adjust motion of the cleaning substrate.

The following description applies to the printing system 10 of FIG. 2. The printing system 10 performs a substrate loading operation, in which cleaning substrate 16 is loaded for a cleaning operation. During such a substrate loading operation of the printing system 10, the first substrate supply mechanism 12 is allowed to release the cleaning substrate 16 so that it can pass onto the conveyor belt 14. When the conveyor belt 14 is activated, the supplied substrate 16 moves with the conveyor belt 14 and the leading edge advances in the conveyance direction 18. Upon reaching the cleaning position, motion of the cleaning substrate 16 is inhibited by controlling the first substrate supply mechanism 12 to adjust motion of the substrate relative to the conveyor belt to prevent further advancement of the substrate 16. This can be done by the control mechanism, by the friction adjustment mechanism 36a (if the friction adjustment mechanism 36a is the control mechanism), or by a combination of both mechanisms (if both are present).

During the substrate loading operation, the friction adjustment mechanism 36b applies a first pressure such that when the conveyor belt 14 is activated, the cleaning substrate 16 moves with the conveyor belt. In other words, the friction adjustment mechanism 36b applies a pressure that is sufficient to maintain the cleaning substrate 16 against the conveyor belt 14, but not so low that the cleaning substrate 16 slides over the conveyor belt 14. As such, when the conveyor belt 14 moves, the cleaning substrate 16 also moves with no sliding, curling, or lifting. The cleaning substrate 16 moves in this manner until it reaches the cleaning position.

During a cleaning operation of the printing system 10 of FIG. 2, the friction adjustment mechanism 36b applies a second pressure, different from the first pressure. The second pressure is such that when the conveyor belt 14 is activated during the cleaning operation, the cleaning substrate 16 slides over the conveyor belt 14. The second pressure is thus sufficient to allow the cleaning substrate 16 disposed on the exterior surface 28 of the conveyor belt 14 to slide over the conveyor belt 14 as the conveyor belt 14 moves.

Figure 3:
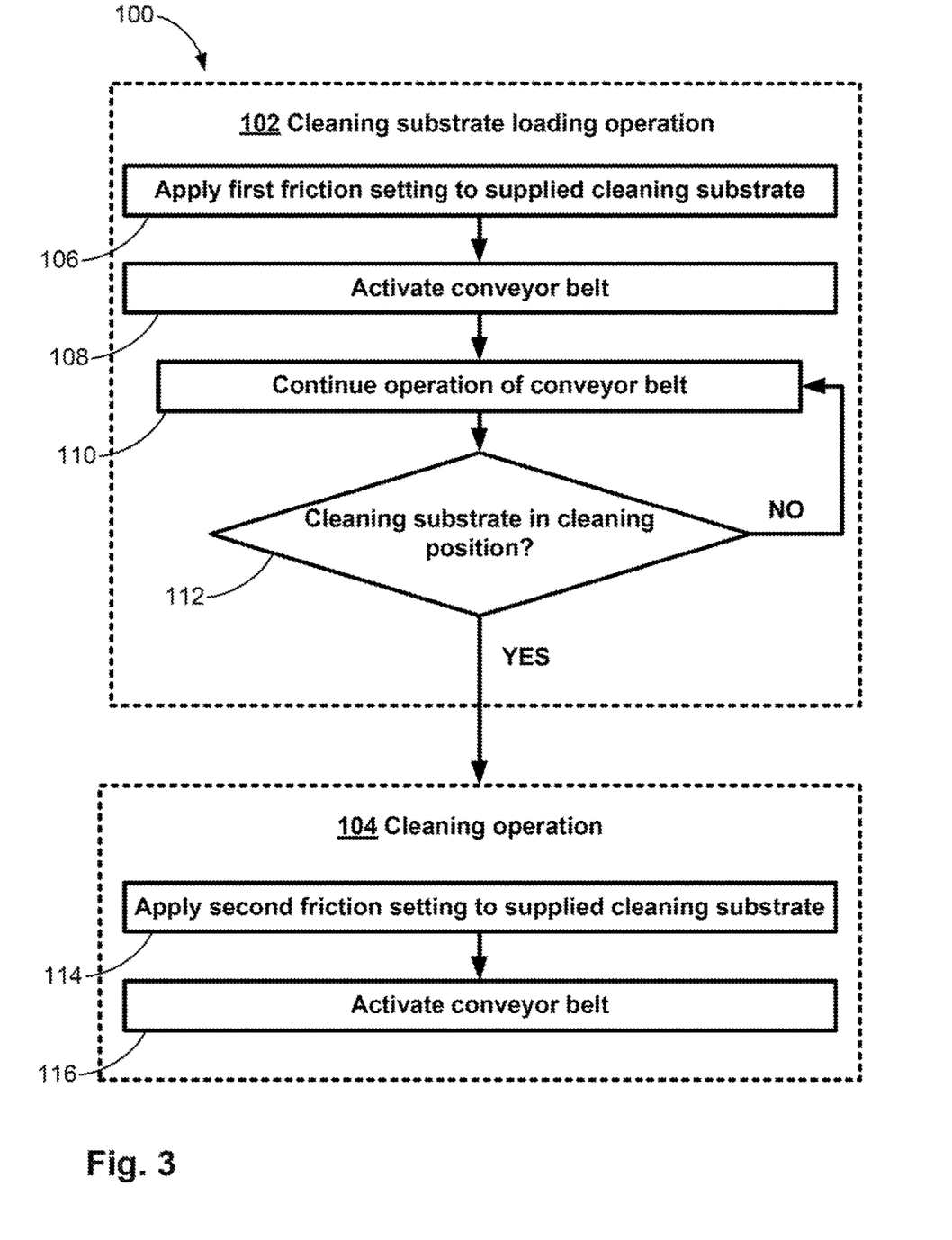
FIG. 3 illustrates a method of operating a printing system according to an example.

FIG. 3 shows a schematic representation of a method 100 of operating a printing system 10 according to an example. As described above, the printing system 10 comprises a first substrate supply mechanism 12 to supply cleaning substrate 16 to a conveyor belt 14. The conveyor belt 14 is to advance the supplied cleaning substrate 16 to a cleaning position.

The method 100 comprises performing a substrate loading operation 102 of the printing system 10 and performing a cleaning operation 104 of the printing system 10. In examples, the substrate loading operation is initiated by a user, via an interface of the printing system 10, after inserting substrate into the first substrate supply mechanism 12. In some examples the interface is a physical interface, for example comprising a keypad mounted onto or communicatively coupled with the printing system 10. In other examples, the interface is an interface implemented using machine readable instructions and accessed for example via a computer connected to the printing system 10 by a network. In some such examples, the substrate loading operation 102 and cleaning operation 104 are performed in response to a user initiating a cleaning process. This allows, for example, a cleaning process to be performed in response to a single command from the user, with conveyor belt cleaning being performed without requiring separate user input. The efficiency of the cleaning process is thus improved.

The substrate loading operation 102 comprises applying 106 a first friction setting to the supplied cleaning substrate 16 to cause the supplied cleaning substrate 16 to remain against the conveyor belt 14. In one example, the first friction setting is applied by friction adjustment mechanism 36a, as described above in relation to FIG. 1. In another example, the first friction setting is applied by friction adjustment mechanism 36b, as described above in relation to FIG. 2. In a further example, the first friction setting is applied by a combination of the friction adjustment mechanism 36a, as described above in relation to FIG. 1 and the friction adjustment mechanism 36b, as described above in relation to FIG. 2.

The substrate loading operation 102 then comprises activating 108 the conveyor belt 14. The first friction setting allows the supplied cleaning substrate 16 to slide with the conveyor belt 14, thereby being advanced by the conveyor belt 14 in the conveyance direction 18. Operation of the conveyor belt 14 continues 110 to continue advancing the cleaning substrate 16 toward the cleaning position. A determination is performed 112 to determine if the cleaning substrate 16 is in the cleaning position. If not, operation of the conveyor belt 14 continues 110. If the cleaning substrate 16 has reached the cleaning position, the conveyor belt 14 is then deactivated.

The cleaning operation 104 comprises applying 114 a second friction setting to the supplied cleaning substrate 16. The second friction setting causes the supplied cleaning substrate 16 to slide relative to the conveyor belt 14. In one example, the first friction setting is applied by friction adjustment mechanism 36a, as described above in relation to FIG. 1. In another example, the first friction setting is applied by friction adjustment mechanism 36b, as described above in relation to FIG. 2. In a further example, the first friction setting is applied by a combination of the friction adjustment mechanism 36a as described above in relation to FIG. 1 and the friction adjustment mechanism 36b, as described above in relation to FIG. 2.

The cleaning operation 104 then comprises activating 116 the conveyor belt 14. The second friction setting is such that the supplied cleaning substrate 16 slides over the conveyor belt 14.

In some examples, instead of deactivating the conveyor belt 14 following the first activation 108, the conveyor belt is activated 108 following application 106 of the first friction setting and remains activated during the cleaning operation 104.

In examples, the substrate loading operation 102 comprises allowing motion of the substrate 16, for example by allowing motion of the substrate supply mechanism 12 as described above. In such examples, the cleaning operation 104 comprises inhibiting or preventing motion of the substrate 16, for example by inhibiting or preventing motion of the substrate supply mechanism 12.

Figure 4:
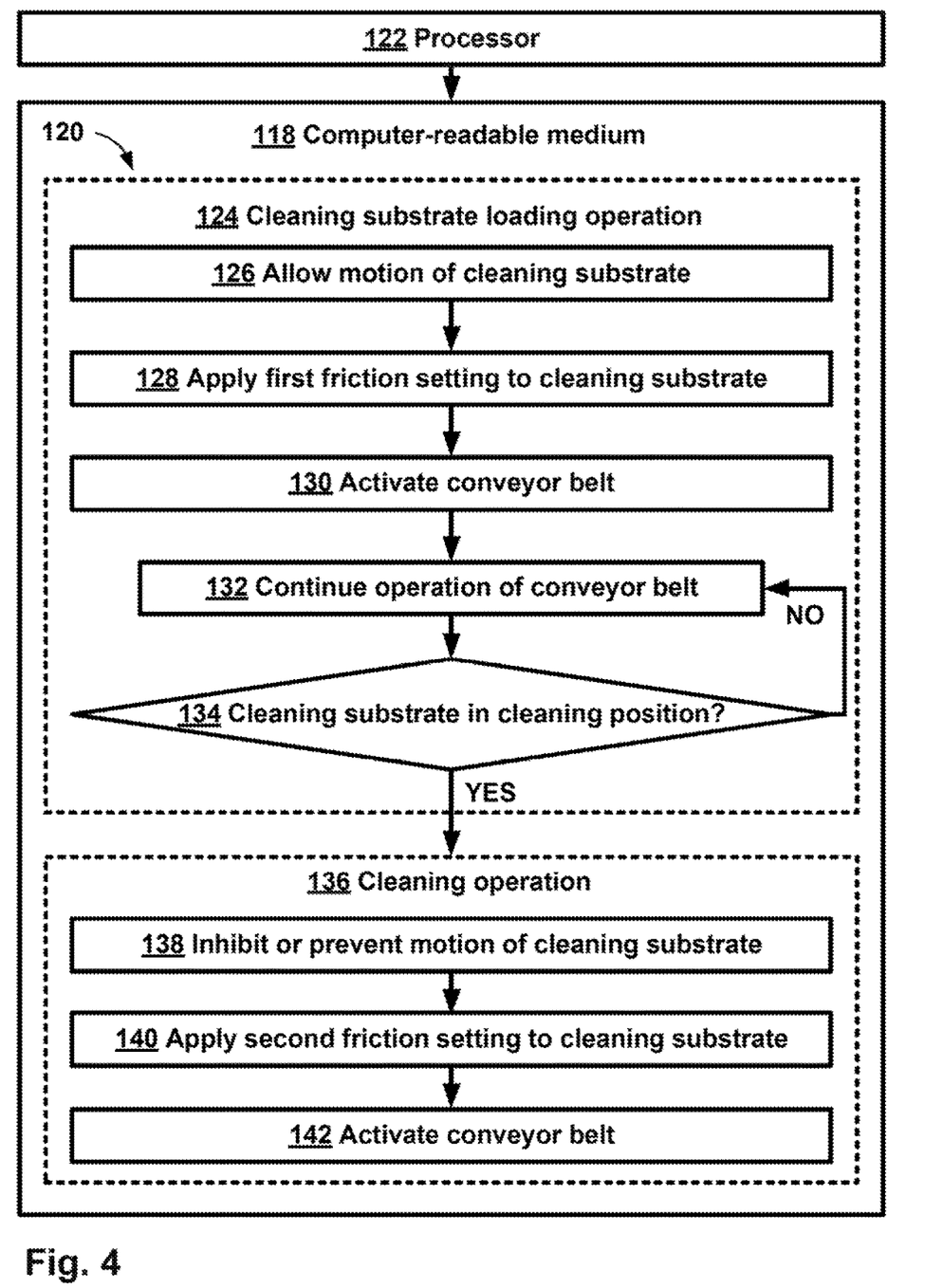
FIG. 4 illustrates a non-transitory computer-readable storage medium according to an example.

FIG. 4 shows an example of a non-transitory computer-readable storage medium 118 comprising a set of computer readable instructions 120 which, when executed by at least one processor 122 of a printing system 10 comprising a first substrate supply mechanism 12 to supply cleaning substrate 16 to a conveyor belt 14, cause the processor 122 to perform a method according to examples described herein. The computer readable instructions 120 may be retrieved from machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The instructions 120 cause the processor 122 to control the printing system 10 to perform a substrate loading operation 124. The substrate loading operation 124 comprises allowing motion 126 of the supplied cleaning substrate 16.

The substrate loading operation 124 comprises applying 128 a first friction setting to the supplied cleaning substrate 16 to cause the supplied cleaning substrate 16 to remain against the conveyor belt, for example as described in more detail above.

The substrate loading operation 124 then comprises activating 130 the conveyor belt 14. The first friction setting allows the supplied cleaning substrate 16 to slide with the conveyor belt 14 so as to be advanced in a conveyance direction toward a cleaning position.

The substrate loading operation 124 comprises continuing to operate 132 the conveyor belt 14 to continue advancing the cleaning substrate 16 toward the cleaning position. A determination 134 is performed to determine if the cleaning substrate 16 is in the cleaning position. If not, operation of the conveyor belt 14 continues 132. If the cleaning substrate 16 has reached the cleaning position, the conveyor belt 14 is then deactivated.

The instructions 123 cause the processor 122 to perform a cleaning operation 136. The cleaning operation 136 comprises inhibiting or preventing 138 motion of the supplied cleaning substrate 16. The cleaning operation 136 comprises applying 140 a second friction setting to the supplied cleaning substrate 16. The second friction setting causes the supplied cleaning substrate 16 to slide relative to the conveyor belt 14. In one example, the first friction setting is applied by friction adjustment mechanism 36a, as described above in relation to FIG. 1. In another example, the first friction setting is applied by friction adjustment mechanism 36b, as described above in relation to FIG. 2. In a further example, the first friction setting is applied by a combination of the friction adjustment mechanism 36a, as described above in relation to FIG. 1 and the friction adjustment mechanism 36b, as described above in relation to FIG. 2.

The cleaning operation 136 then comprises activating 142 the conveyor belt 140. As described in more detail above, the supplied substrate slides over the conveyor belt 14.

In some examples, instead of deactivating the conveyor belt 14 following the first activation 130, the conveyor belt is activated 130 following application 128 of the first friction setting and remains activated during the cleaning operation 136.

In an example implementation of the present disclosure, a conveyor belt may be cleaned by employing the printing system 10 to perform the method described. In summary, the cleaning process comprises: loading cleaning media onto the first substrate supply mechanism; supplying cleaning media from the first substrate supply mechanism to the conveyor belt until the cleaning media is in a cleaning position (i.e. allowing motion of the belt to advance the cleaning media); inhibiting or preventing motion of the media relative to the movement of the belt (i.e. the cleaning media will slip relative to the belt and effectively "scrub" any deposits from the conveyor belt).

In another example implementation, if a level of cleanliness of the conveyor belt is insufficient after completion of the cleaning operation, the operation can be repeated. The operation may be repeated with the same settings as previously, or the first and/or second friction settings that is/are applied may be adjusted to try to achieve a greater level of cleaning. This may be, for example, by increasing the pressure exerted by the vacuum on the cleaning substrate so as to increase the downforce of the cleaning substrate on the conveyor belt (thereby increasing friction between the two).

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A printing system comprising:
   a conveyor belt;
   a first substrate supply mechanism to supply a cleaning substrate to the conveyor belt;
   wherein the conveyor belt is to advance a supplied cleaning substrate, and the first substrate supply mechanism is controllable to adjust motion of the substrate relative to the conveyor belt such that when the conveyor belt is activated the supplied cleaning substrate slides relative to the conveyor belt; and
   the printing system further comprising a friction adjustment mechanism to adjust an amount of friction between the conveyor belt and the supplied substrate; and
   the printing system further comprising a second substrate supply mechanism to supply print substrate to the conveyor belt, wherein the conveyor belt is to advance a supplied print substrate.

2. A printing system according to claim 1, wherein the friction adjustment mechanism controls the first substrate supply mechanism to adjust motion of the cleaning substrate relative to the conveyor belt.

3. A printing system according to claim 1, wherein the friction adjustment mechanism prevents motion of the substrate relative to the conveyor belt by engaging a locking element with the first substrate supply mechanism.

4. A printing system according to claim 1, wherein the friction adjustment mechanism comprises, or further comprises, a pressure application mechanism to adjust a pressure applied to the cleaning substrate by the conveyor belt, and vice versa.

5. A printing system according to claim 4, wherein the pressure application mechanism comprises a vacuum pump.

6. A printing system according to claim 1, wherein:
   the first substrate supply mechanism comprises a shaft to receive a substrate roll, the shaft being rotatable by a servo; and
   the friction adjustment mechanism controls the servo to adjust motion of the cleaning substrate relative to the conveyor belt.

7. A printing system according to claim 6, wherein the first substrate supply mechanism and the second substrate supply mechanism comprise a same supply mechanism.

8. A printing system according to claim 7, wherein the same supply mechanism is to interchangeably receive the cleaning substrate and the print substrate.

9. A printing system according to claim 1, further comprising:
   a cleaning substrate, the cleaning substrate including a cleaning surface comprising at least one of:
   a textured surface;
   a rough surface;
   an uneven surface;
   a solvent; and
   a first portion including a solvent and a second portion excluding a solvent.

10. A method of operating a printing system, the method comprising:
    performing a cleaning substrate loading operation of the printing system, the cleaning substrate loading operation comprising:
      applying a first friction setting to the supplied cleaning substrate to cause the supplied cleaning substrate to remain against the conveyor belt;
      activating the conveyor belt, the first friction setting allowing the supplied cleaning substrate to be advanced by the conveyor belt; and
      adjusting movement of the supplied cleaning substrate relative to the conveyor belt when the cleaning substrate is located in a cleaning position;
    performing a cleaning operation of the printing system, the cleaning operation comprising:
      applying a second friction setting, different from the first friction setting, to the supplied cleaning substrate to cause movement of the supplied cleaning substrate relative to the conveyor belt to be adjusted;
      activating the conveyor belt, the second friction setting allowing the supplied cleaning substrate to slide relative to the conveyor belt;
    inspecting the conveyor belt after the cleaning operation to determine cleanliness of the conveyor belt; and
    responsive to a determination that cleanliness of the conveyor belt is insufficient:
      performing another cleaning operation of the printing system, the another cleaning operation comprising:
        applying a third friction setting, different from the first and second friction settings, to the supplied cleaning substrate to cause the supplied cleaning substrate to remain against the conveyor belt; and
        activating the conveyor belt, the third friction setting allowing the supplied cleaning substrate to slide relative to the conveyor belt.

11. The method of claim 10, wherein inhibiting movement of the cleaning substrate relative to the conveyor belt comprises inhibiting movement of the cleaning substrate supply mechanism.

12. The method of claim 10, wherein the first and second friction settings, or first, second and third friction settings, comprise vacuum pressures.

13. A non-transitory computer-readable storage medium comprising a set of computer-readable instructions stored thereon, which, when executed by a processor of a print system comprising a cleaning substrate supply mechanism to supply cleaning substrate to a conveyor belt, wherein the conveyor belt is to advance a supplied cleaning substrate, cause the processor to control the printing system to:

perform a cleaning substrate loading operation of the printing system, the cleaning substrate loading operation comprising:

applying a first friction setting to the supplied cleaning substrate to cause the supplied cleaning substrate to remain against the conveyor belt;

activating the conveyor belt, the first friction setting allowing the supplied cleaning substrate to be advanced by the conveyor belt; and         adjusting movement of the supplied cleaning substrate relative to the conveyor belt when the cleaning substrate is located in a cleaning position;

perform a cleaning operation of the printing system, the cleaning operation comprising:

applying a second friction setting, different from the first friction setting, to the supplied cleaning substrate to cause movement of the supplied cleaning substrate relative to the conveyor belt to be adjusted;

activating the conveyor belt, the second friction setting allowing the supplied cleaning substrate to slide relative to the conveyor belt;

inspect the conveyor belt after the cleaning operation to determine cleanliness of the conveyor belt; and     responsive to a determination that cleanliness of the conveyor belt is insufficient:

perform another cleaning operation of the printing system, the another cleaning operation comprising:

applying a third friction setting, different from the first and second friction settings, to the supplied cleaning substrate to cause the supplied cleaning substrate to remain against the conveyor belt; and             activating the conveyor belt, the third friction setting allowing the supplied cleaning substrate to slide relative to the conveyor belt.

\* \* \* \* \*